United States Patent
Ishihara (10) Patent No.: US 6,682,218 B2
(45) Date of Patent: Jan. 27, 2004

(54) LINEAR MOTION GUIDE UNIT WITH SEPARATOR BETWEEN ANY TWO ADJOINING ROLLING ELEMENTS

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 22 days.

(21) Appl. No.: 10/091,417

(22) Filed: Mar. 7, 2002

(65) Prior Publication Data

US 2003/0118256 A1 Jun. 26, 2003

(30) Foreign Application Priority Data

Dec. 25, 2001 (JP) ........................................ 2001-391276

(51) Int. Cl.$^7$ .............................................. F16C 29/06
(52) U.S. Cl. ........................................... 384/45; 384/51
(58) Field of Search .............................. 384/43, 44, 45, 384/49, 51

(56) References Cited

U.S. PATENT DOCUMENTS

| | | | |
|---|---|---|---|
| 4,880,317 A | | 11/1989 | Teramachi |
| 5,308,164 A | * | 5/1994 | Tanaka .......................... 384/13 |
| 5,927,858 A | * | 7/1999 | Agari ............................ 384/45 |
| 6,203,199 B1 | | 3/2001 | Pfeuffer |
| 6,309,107 B1 | * | 10/2001 | Ueki et al. ..................... 384/45 |
| 6,435,720 B1 | * | 8/2002 | Yabe et al. .................... 384/43 |
| 6,513,977 B2 | * | 2/2003 | Kasuga et al. ................. 384/43 |
| 2001/0008568 A1 | * | 7/2001 | Kasuga et al. ................. 384/45 |
| 2001/0012415 A1 | | 8/2001 | Kasuga et al. |

FOREIGN PATENT DOCUMENTS

| | | |
|---|---|---|
| DE | 2627025 A1 | 6/1976 |
| DE | 101 10 220 A1 | 9/2001 |
| EP | 0 857 883 A1 | 8/1998 |
| EP | 1 048 860 A1 | 11/2000 |
| JP | 281154/1998 | 10/1998 |
| JP | 304046/2000 | 10/2000 |
| JP | 12465/2001 | 1/2001 |
| JP | 193739/2001 | 7/2001 |

* cited by examiner

Primary Examiner—Thomas R. Hannon
(74) Attorney, Agent, or Firm—Browdy and Neimark (57) ABSTRACT

A linear motion guide unit is disclosed in which a separator is made to fit over or embrace any adjacent rolling element, thereby realizing quiet operation and wear-resistance, with even under high-speed, high-cycle sliding motion. The separator has a round outside peripheral surface, and forward and aft end faces that are made concave to fit over the associated rolling elements. An end cap is made up of a spacer part having a lug to provide a radially inside curved surface of a turnaround, and a major part to provide a radially outside curved surface of the turnaround when mounted on a carriage through the spacer part. Cut in the radially inside curved surface on the lug is a gutter for relief, which extends circumferentially ilk along the center of the radially inside curved surface on the lug, thereby allowing the separator to travel through the turnaround without any interference with the radially inside curved surface of the turnaround.

12 Claims, 9 Drawing Sheets

LINEAR MOTION GUIDE UNIT WITH SEPARATOR BETWEEN ANY TWO ADJOINING ROLLING ELEMENTS

BACKGROUND OF THE INVENTION

1. Field of the Invention

The present invention relates generally to a linear motion guide unit adapted for use in various types of machinery such as semiconductor manufacturing machines, precision measuring instruments, precision assembly machines and, more particularly, to a linear motion guide unit in which a slider is movable on an elongated track rail by virtue of rolling elements that are allowed to run through recirculating passages, together with separating elements each arranged between any adjacent rolling elements.

2. Description of the Prior Art

Although current linear motion guide units have been used extensively in diverse fields of machinery such as machine tools, semiconductor manufacturing equipment, conveying systems, inspection instruments, measuring means, processing systems, assembly machines, various industrial robots, and so on, the scope of their useful applications is still expanding with the development of technology. To this end, the linear motion guide units are seeing growing demands for less noise or vibration, reduction of wear, long-lasting service life, high precision, high-speed sliding motion, easy assembly, generally accepted usage, and so on. In recent years, especially, the linear motion guide unit is much expected in which separators are each interposed between any two adjoining rolling elements to lower noise, reducing wear thereby realizing long-lasting service life.

Figure 16:
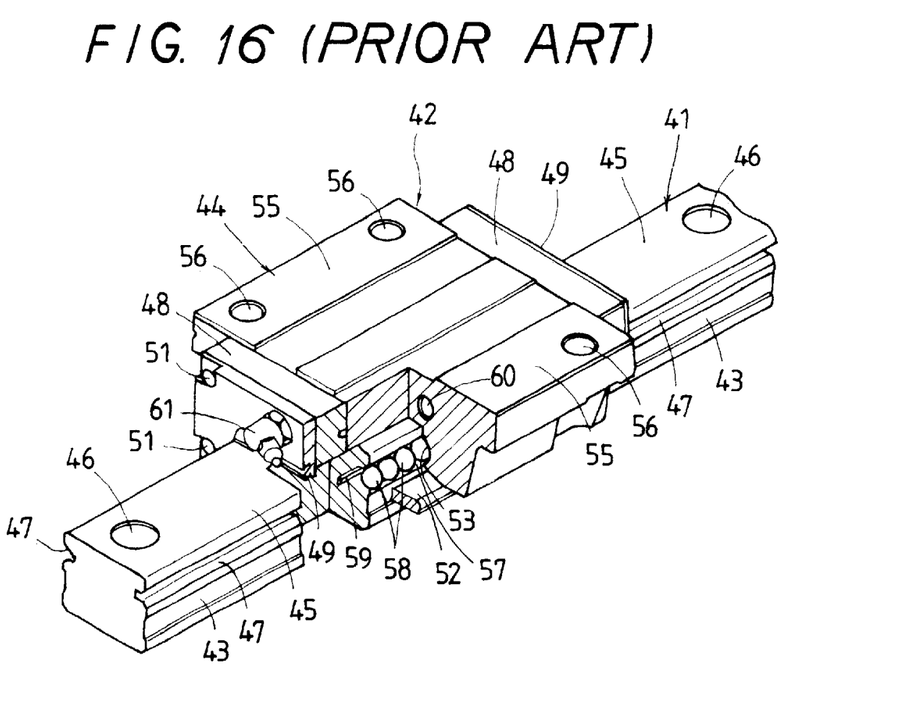
FIG. 16 is a perspective view, partially broken away, showing a prior linear motion guide unit.

A linear motion guide unit as shown in FIG. 16 is disclosed in, for example Japanese Patent Laid-Open No. 12465/2001. The prior linear motion guide unit is generally composed of an elongated track rail 41 and a slider 42 that fits over the track rail 41 for linear movement along the track rail 41. Raceway grooves 47 are made on lengthwise sides 43 of the track rail 41, one to each side. Moreover, the track rail 41 is made on a top surface 45 thereof with openings 46 in which bolts fit to fasten the track rail 41 on any of a bed, machine base, and so on. The slider 42 is comprised of a carriage 44 fitting over and conforming to the track rail 41, end caps 48 secured on forward and aft ends of the carriage 44, one to each end, and end seals 49 arranged on lengthwise outermost faces of the end caps 48 to close clearances between the track rail 41 and the end caps 48. Fastening screws 51 are to join together both the end caps 48 and the end seals 49 to the carriage 44, while sidewise opposing bottom seals 52 are arranged underneath both the carriage 44 and the end caps 48. The carriage 44 is made therein with raceway grooves 53 confronting the raceway grooves 47 on the track rail 41. Made open on an upper surface 55 of the carriage 44 are holes 56 having female threads that fit on male threads of associated bolts or screws to fasten the carriage 44 to other component such as a work table and the like. Rolling elements such as balls 58 are arranged in load-bearing raceways 57, which are defined between the raceway grooves 47 on the track rail 41 and the raceway grooves 53 in the carriage 44, so as to be allowed to run through the load-bearing raceways 57, thereby moving the slider 42 in a sliding way along the track rail 41. Retainer bands 59 serve continuing to keep the rolling elements 58 against escape out of the carriage 44 even after the slider 42 has been detached from the track rail 41. The rolling elements 58 are charged in the linear motion guide unit in a way allowed to run through a ball-recirculating circuits, each of which includes the load-bearing raceway 58 and a non-loaded raceway that is made up of a return passage 60 bored in the carriage 44 and turnarounds, not shown, formed in the end caps 48, one to each end cap, to connect at opposite ends thereof with the associated load-bearing raceway 57 and return passage 60, thereby completing the ball-recirculating circuit. A grease nipple 61 to apply lubricant into the ball-recirculating circuits is attached to the associated end cap 48 in a way extending outside from the end face of the associated end seal 49.

Nevertheless, the current linear motion guide units, as coming used in the machines that are getting faster in operating speed and cycle, must be further refined on wear proof and quietness in operation. With the prior linear motion guide unit having any separator interposed between two adjoining rolling elements, moreover, any construction that the separator travels with keeping to fit snugly over the associated rolling elements is critical for making sure of steady movement of the rolling elements throughout the ball-recirculating circuit even under modern high-speed operation. For allowing the separator to move with fitting over the associated rolling element, it will be sufficient only to make the separator large in outside diameter, but in this instance it remains a major challenge to make the separators recirculate smoothly together with the associated rolling elements.

Another example of the prior linear motion guide units is disclosed in Japanese Patent Laid-Open No. 281154/1998, in which a separator is arranged between any two adjoining rolling elements to lessen the vibration and noise that might be caused by any regular run of the rolling elements, thus keeping the rolling elements against premature wear. The separator interposed between the two adjoining rolling elements in the linear motion guide unit recited just above, when made large in the outside diameter thereof, is made up of a flat core area and a funnel-shaped peripheral area diverging radially outwardly around the core area. The separator constructed as stated earlier, even though made in the diameter coming into sliding contact with the radially inside curved surface of the associated turnaround, will change place radially outwardly in a direction normal to the running direction of the separator owing to the centrifugal force caused when the separator travels through the turnaround. This behavior will keep the separator from any interference with the radially inside curved surface of the associated turnaround. With the linear motion guide unit stated earlier, however, the separator is apt to experience any wandering in directions normal to the traveling direction of the rolling elements even during the linear travel in any of the load-bearing raceway and return passage because the separator has the flat core area to provide a clearance for allowing the associated rolling element to change place relatively to the concave surface of the separator confronting the rolling element when the separator moves through the turnaround. Thus, the prior linear motion guide unit constructed as stated earlier will get unsteady in the travel of the separator.

Disclosed in Japanese Patent Laid-Open No. 304046/2000 is another example of the prior linear guide bearing arrangement with a separator interposed between any two adjacent rolling elements. With the linear guide bearing arrangement cited above, a curved raceway where the rolling elements are allowed to turn round in sequence is designed to have a radially inside surface of composite curve having more than one curvature different in radius of curvature, rather than an unitary simple semicircular curve. According to the curved raceway constructed as stated earlier, the separator, even if made large in outside diameter, may be kept from any contact at the outside periphery thereof with the radially inside surface of the curved raceway. Nevertheless, the radially inside surface of the curved raceway, because made in the complex shape, introduces expensive machining and forming operations.

Japanese Patent Laid-Open No. 193739/2001 discloses a further another example of the prior linear guide bearing arrangement with a separator interposed between any two adjacent rolling elements, in which balls are accommodated in concaves formed on forward and aft end faces of the associated separator and are allowed to roll with keeping concurrent rolling-contact with both of radially opposing guide surfaces: radially inside and outside curved surfaces of a turnaround. Moreover, the separator is made to have an outer diameter more than the maximum outer diameter allowed when the balls travel through the turnaround with keeping concurrent rolling-contact with both the radially inside and outside curved surfaces of the turnaround, while the radius of curvature defining the curved surfaces in the turnaround is made reduced to keep the separator from any interference with the curved surfaces. With the linear guide bearing arrangement recited just above, even the separator large in outer diameter may travel with no obstacle through the turnaround that has the radially inside curved surface of unitary simple semicircular shape. Besides, the radius of curvature defining the radially inside curved surface in the turnaround is made reduced to the extent where the separator is allowed to roll with no interference with the curved surface.

The prior linear guide bearing arrangement discussed earlier, whether former or latter, has the turnaround where the radially inside curved surface thereof is reduced in radius of curvature so that the curved raceway itself increases somewhat in transverse cross-section. This turnaround construction will allow the rolling elements to roll through there in the absence of rattling sound because the separator large in outer diameter embraces steady the associated rolling elements, whenever the linear guide bearing arrangement is used in horizontality. However, most linear motion guide units are commonly used in every posture: verticality, upside down posture, and so on rather than horizontality. In these instances, both the rolling elements and separators will cause the rattling noise when they run through the widthwise enlarged area of the curved raceway in the turnaround and also the recirculating travel of the rolling elements together with the separators will be liable to unsteady condition.

German Patent DT 2627025 A1 discloses a recirculating-ball steering gear having a separator interposed between any two adjoining rolling elements. The separator is made bulged radially outwardly around the outside periphery thereof to experience a propulsive force that is in a direction at any angle more than 200 even when the separator comes into sliding contact with a radially inside surface of the curved passage. With the recirculating-ball steering gear recited earlier, the separator made large in outer diameter thereof comes into sliding engagement with the radially inside curved surface of the turnaround, encountering much frictional resistance to be much subjected to wear. Thus, it is very tough to expect the smooth recirculation of the rolling elements in the prior recirculating-ball steering gear recited here.

SUMMARY OF THE INVENTION

The present invention, therefore, has as its primary object to overcome the major problem discussed earlier and in particular to provide a linear motion guide unit in which a separator is interposed between any two adjoining rolling elements to fit over or embrace the associated rolling elements so as to allow the rolling elements together with the separators to run smoothly, steady through a ball-recirculating circuit without causing rattling sound, thereby making sure of realizing the reduction of noise and wear. Especially, it is often tough for the separators large in outer diameter to travel through the turnaround without seeing any interference with the curved guide surfaces. To cope with this, according to the present invention, a linear motion guide unit is provided in which a radially inside curved surface of the turnaround is made a gutter for relief, which extends in the direction along which the rolling elements run through the turnaround. This construction helps making sure of smooth travel of the separator throughout the ball-recirculating circuit.

The present invention is concerned with a linear motion guide unit comprising; a track rail having a first raceway groove extending lengthwise thereof and a slider arranged for movement relatively to the track rail by virtue of more than one rolling element, the slider being comprised of a carriage made thereon with a second raceway groove confronting the first raceway groove on the track rail to define a raceway between them, where the rolling elements are allowed to run through there, and also made therein with a return passage allowing the rolling elements to run through there, end caps fastened on forward and aft ends of the carriage, one to each end, and each made therein a turnaround that connects the raceway with the return passage to allow the rolling elements to turn round there, and more than one separator interposed between any two adjoining rolling elements to travel together with the rolling elements, wherein the separator has a round outside peripheral surface, and forward and aft end faces that are made concave to fit over the associated rolling elements, and wherein the turnaround formed in the end cap has a radially inside curved surface where a gutter for relief is cut in a way extending circumferentially of the turnaround, thereby allowing the separator to travel through the turnaround without any interference with the radially inside curved surface of the turnaround.

In one aspect of the present invention, a linear motion guide unit is disclosed in which the end cap is comprised of a spacer part having a lug to provide the radially inside curved surface of the turnaround when the spacer part is fastened on the associated end of the carriage, and a major part to provide a radially outside curved surface of the turnaround when mounted on the carriage through the spacer part.

In another aspect of the present invention a linear motion guide unit is disclosed in which the spacer part integral with the lug is joined firmly to the major part with only fitting in a recess formed in the major part, whereby the turnaround is completed.

In another aspect of the present invention, a linear motion guide unit is disclosed in which the gutter for relief is cut in the lug in a way extending circumferentially along a center of the radially inside curved surface of the turnaround.

In another aspect of the present invention, a linear motion guide unit is disclosed in which the spacer part has positioning pins that protrude from the rears of the lugs, which confront the carriage, while the carriage is made on the end face thereof with positioning holes that are bored in opposition to the positioning pins, whereby only fitting the positioning pins into the positioning holes on the end face of the carriage is sufficient to make sure of connection of the spacer part to the carriage.

In another aspect of the present invention a linear motion guide unit is disclosed in which the major part of the end cap has outside joint tongues each of which is adapted to fit into any associated open end of the return passage in the carriage, while the spacer part has inside joint tongues each of which is also allowed to fit into any associated open end of the return passage in the carriage, and wherein the outside and inside joint tongues are mated together in alignment with each other to be connected to the associated return passage.

In a further another aspect of the present invention, a linear motion guide unit is disclosed in which a tubular member of sintered resinous material having cellular texture is nested inside the return passage in the carriage to extend between the lengthwise opposing joint tongues and the tubular member can contain therein lubricant.

In another aspect of the present invention a linear motion guide unit is disclosed in which the concaved surface is made to have a radius of curvature, which is just a little larger than that of the rolling element.

In another aspect of the present invention a linear motion guide unit is disclosed in which the separator is made as thin as possible in thickness left between the concaved surfaces arranged back to back with one another, so that the adjoining rolling elements are separated a little bit away from each other.

In another aspect of the present invention a linear motion guide unit is disclosed in which the separator is made rounded at forward and aft circumferential edges where the outside periphery merges with the concaved surfaces, so that the rounded edges would help make sure of smooth travel of the separator throughout the ball-recirculating circuit even if there were any discrepancy in position between the carriage and the end cap to cause some misalignment between either the load-bearing raceway or the return passage and the associated turnaround for the ball-circulating circuit.

In a further another aspect of the present invention a linear motion guide unit is disclosed in which the track rail has first raceway grooves on the lengthwise sides thereof, one to each side, while the slider fits over and conforms to the track rail for sliding movement relatively to the track rail by virtue of the rolling elements and the separators.

In another aspect of the present invention a linear motion guide unit is disclosed in which the track rail has a pair of lengthwise side walls spaced sidewise apart from and connected with each other, and also made on their sidewise opposing sides with the first raceway grooves, while the slider is accommodated in a guide channel between the side walls of the track rail for sliding movement lengthwise the track rail.

The linear motion guide unit constructed as stated earlier may be adapted well to the track rail of any traverse cross-section, whether I-shape or U-shape. As the separators are allowed to run through the ball-recirculating circuit with keeping fitting over or embracing the associated rolling elements, the linear motion guide unit, even though used at any posture: verticality, upside down posture, and so on rather than horizontality, will cause no distortion owing to the centrifugal force exerted by the running separator, thus raising no rattling sound that might otherwise occur between the rolling elements and the separators. The gutter for relief formed circumferentially on the radially inside curved surface of the turnaround, especially, makes sure of keeping the separator from any interference with the radially inside curved surface of the turnaround, thereby realizing quiet operation and wear-resistance, with even under high-speed, high-cycle sliding motion.

With the linear motion guide unit of the present invention constructed as stated earlier, the separators are each interposed between any two adjoining rolling elements in a way fitting over the associated rolling elements and further the gutter for relief is cut circumferentially in the center of the radially inside curved surface of the turnaround to avoid any interference of the separators with the radially inside curved surface of the turnaround. As a result, the linear motion guide of the present invention, whether used in horizontality or in every posture: verticality, upside down posture, and so on rather than horizontality, makes sure of smooth, steady travel of the rolling elements together with the separators through the ball-recirculating circuit without causing any rattling, thereby realizing quiet operation, wear-resistance and long-lasting service life, with even under high-speed, high-cycle sliding motion.

DETAILED DESCRIPTION OF THE PREFERRED EMBODIMENTS

Referring now in detail to the drawings, there is shown a linear motion guide unit according to the present invention, in which a separator is interposed between any two adjoining rolling elements. The linear motion guide unit discussed later is envisaged to meet functional demands: high-speed, high-cycle sliding motion, wear-resistance, and so on, which will be expected for diverse machines such as semiconductor manufacturing machines, precision measuring instruments, precision inspection instruments, precision assembly machines and so on, which are made in a wide range of sizes, from very small instruments to very large machines. Although but the illustrative embodiment of the present invention will be discussed later on the linear motion guide unit in which a slider 12 fits for sliding movement in a track rail 11 open upward to form an U-shape in traverse cross-section as shown in FIGS. 1 to 3, it will be appreciated that the present invention may be applied equally to other type of a linear motion guide unit as shown in FIG. 16 to explain the prior art, in which the slider 42 fits over and conform to the track rail 41 of I-shape in transverse cross-section.

Figure 1:
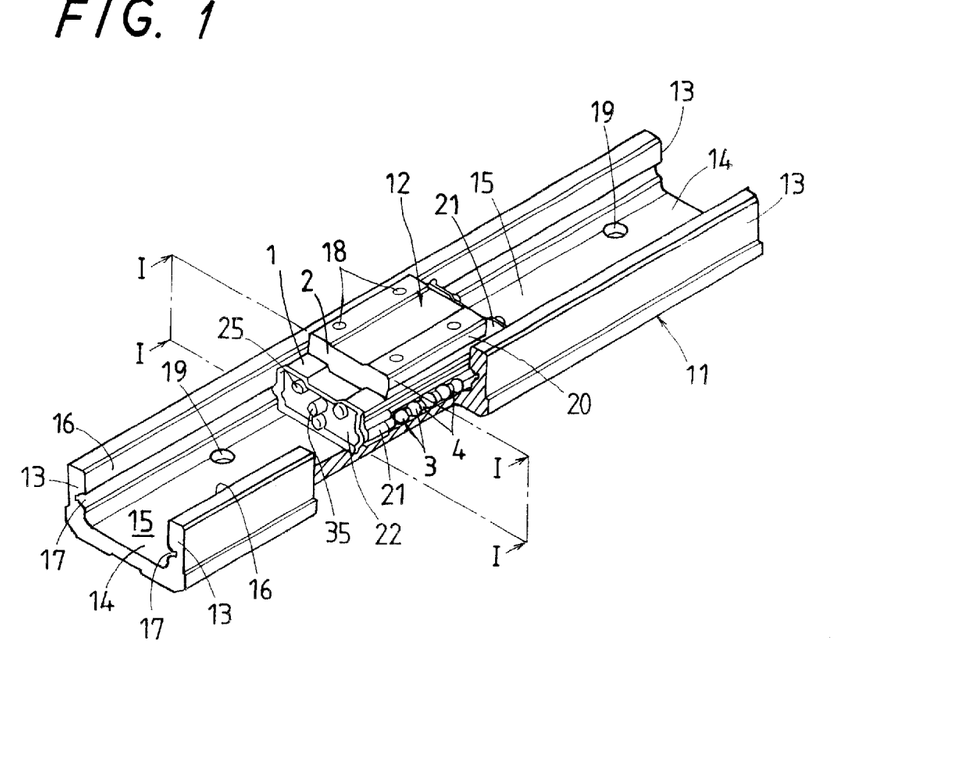
FIG. 1 is a perspective view, partially broken away, showing a preferred embodiment of a linear motion guide unit according to the present invention.
Figure 2:
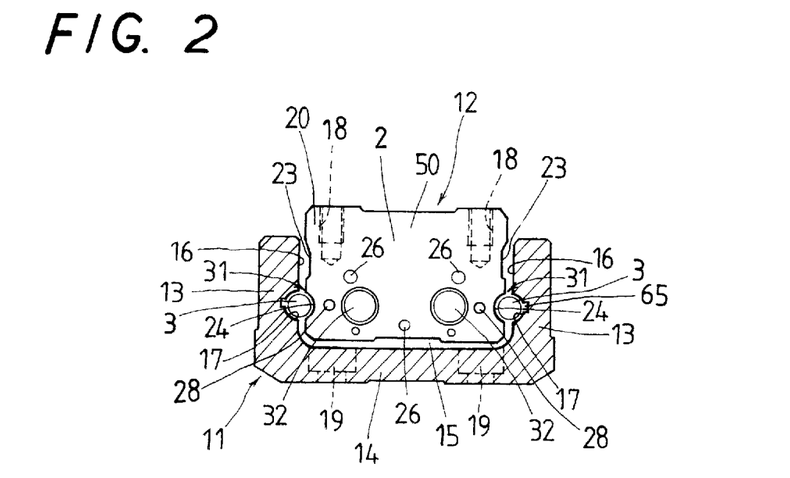
FIG. 2 is a transverse cross-sectional view of the linear motion guide unit shown in FIG. 1 and taken along the line I—I.
Figure 3:
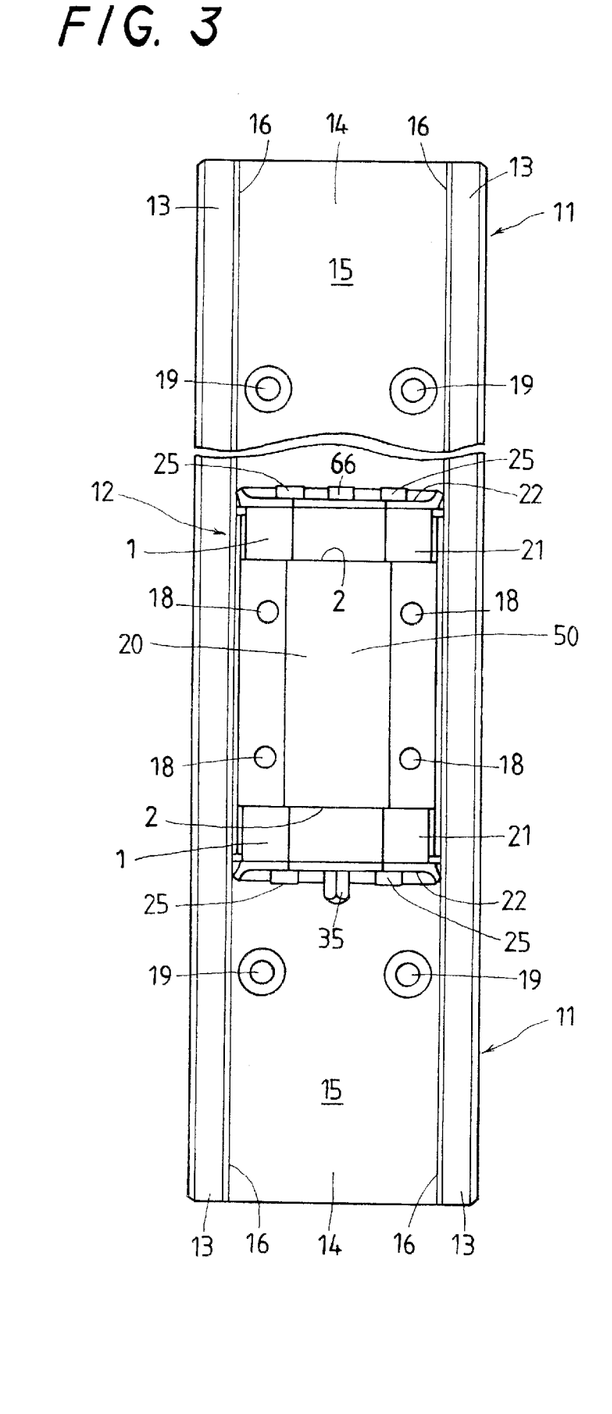
FIG. 3 is a top plan view showing the linear motion guide unit of FIG. 1.

The illustrative linear motion guide unit is used in a way interposed between any stationary side such as a machine bed and a counterpart such as a work table movable relatively to the stationary side, and is chiefly comprised of the elongated track rail 11 and the slider 12 that fits in the track rail 11 for sliding movement with respect to the track rail 11 as seen from FIGS. 1 to 3. According to the illustrative embodiment, the track rail 11 has bolt holes 19 in which bolts fit to fasten the track rail 11 on any machine bed, while the slider 12 has holes 18 where screws are driven to join together the slider 12 with any table. Thus, the movement of the slider 12 relatively to the track rail 11 makes the table travel with respect to the machine bed. Although but only one slider 12 is shown as fitting in the track rail 11 in FIGS. 1 to 3, it will be appreciated that more than one slider may be arranged in the track rails 11.

The linear motion guide unit stated here is generally comprised of the track rail 11 made with lengthwise raceway grooves 17: first raceway grooves, and the slider 12 movable relatively to the track rail 11 through more than one rolling elements 3 or balls. The track rail 11 includes lengthwise side walls 13 that are made with sidewise opposing raceway grooves 17 on widthwise opposing inside surfaces 16 thereof. The slider 12 is chiefly made up of a carriage 20 provided therein with raceway grooves 24: second raceway grooves confronting the first raceway grooves 17 of the track rail 11 and return passages 32 where the rolling elements 3 are allowed to run through there, end caps 21 arranged on forward and aft ends of the carriage 20, one to each end, the end caps 21 being each made therein with turnarounds 33 to connect the return passages 32 with load-bearing raceways 31 defined between the confronting first and second raceway grooves 17, 24, where the rolling elements 3 are allowed to turn round there, and separators 4 each interposed between any two adjoining rolling elements 3, with fitting snugly over the associated rolling elements 3 to travel together with the rolling elements 3. The second raceways grooves 24 are formed on the widthwise opposing sides 23 of the carriage 20, which confront the inside surfaces 16 of the track rail 11, one to each inside surface. Formed between the first raceway grooves 17 on the track rail 11 and the second raceway grooves 24 on the carriage 20 are the load-bearing raceways 31 where the rolling elements 3 run through there together with the separators 4. Thus, the slider 12 will travel smoothly along the track rail 11 by virtue of the rolling elements 3 that run through the load-bearing raceways 31.

The track rail 11 is composed of a pair of widthwise opposing side walls 13 connected integrally along their lower edges with a bottom 14 to form a lengthwise guide channel 15 open upward. The raceway grooves 17 formed on the inside surfaces of the side walls 13 of the track rail 11 are each made at the bottom thereof with lengthwise trough 65 for relief. The slider 12 is accommodated for lengthwise sliding movement in the guide channel 15 defined between the widthwise opposing side walls 13 of the track rail 11. The track rail 11, since made in the U-shape in transverse cross-section, is high in geometrical moment of inertia compared with, for example the track rail 41 of I-shape in cross section as shown in FIG. 16 and, therefore, has considerably higher stiffness resistant against any bending and/or twisting caused by the high-speed motion of the slider 12. This U-shaped track rail 11 thus makes it possible to adopt any supporting construction of either cantilever mode where the track rail 11 is supported at only one lengthwise end thereof or bridge mode where the track rail 11 is supported at both lengthwise opposing ends thereof, besides most common supporting construction in which the track rail 11 is supported throughout the bottom thereof. Moreover, this type of the track rail 11 may serve as any structural member of the machinery or apparatus in which the slider unit is applied. The track rail 11 is made reduced as low as possible in height to render the linear motion guide unit compact or slim. In addition, the track rail 11 may have mounted directly with peripheral equipments such as a driving mechanism to actuate the slider 12 of the linear motion guide unit.

The slider 12, moreover, has end seals 22 arranged on the outside end faces of the forward and aft end caps 21, one to each end cap, to close clearances between the end caps 21 and the track rail 11. The carriage 20 of the slider 12 is mostly accommodated in the guide channel 15 of the track rail 11. The end caps 21 and end seals 22 are tightened together to the carriage 20 by means of fastening screws 25 that extend through bolt holes 36 bored in the end caps 21 and the end seals 22. To this end, the carriage 20 is provided with more than one hole 26 having female threads that mate with male threads of the associated fastening screws 25.

The carriage 20 for the slider 12 is made in the form of a substantially rectangular parallelepiped having a width that may be nested snugly in the track rail 11. The carriage 20 is made as reduced as possible in height likewise with the track rail 11. Especially, a slider head 50 on the carriage 20 protrudes above top faces of the side walls 13 of the track rail 11. An amount of height above the side walls 13 is determined conforming to the machinery to which the linear motion guide unit is applied. That is to say, the slider 12 is so made as to provide, along with the track rail 11, the linear motion guide unit that is compact or slim in construction. Thus, linear motion guide unit of the present invention allows extended freedom of design considerations for various peripheral equipments: driving mechanisms such as driving motors, ball bushings to force the slider 12 relatively to the track rail 11. This helps make the machinery, to which the linear motion guide unit is applied, less in size and weight.

With the linear motion guide unit constructed as stated earlier, the ball-recirculating circuit is made up of the load-bearing raceway 31 defined between the confronting raceway grooves 17, 24, the non-loaded return passage 32 formed in the carriage 20 to allow the rolling elements 3 to recirculate through there, and the non-loaded turnarounds 33 formed in the end caps 21 to connect the load-bearing raceway 31 with the non-loaded return passage 32. The rolling elements 3 are arranged successively in the ball-recirculating circuit so as to run through the circuit, with spaced apart from each other by separators 4 that are each interposed between any two adjoining rolling elements 3 so as to fit over or embrace the associated rolling elements 3 to make sure of smooth run of the rolling elements 3. A grease nipple 35 installed on the slider 12 to apply lubricant into the ball-recirculating circuits fits in an opening 38 of the associated end cap 21 in a way extending outside from the end face of the associated end seal 22. Lubricant will be applied to the ball-recirculating circuits through the grease nipple 35. A plug 66 is attached to the other end cap 21 to keep lubricant from leakage. Any clearance between the carriage 20 and the track rail 11 is covered with an upper seal that keeps the load-bearing raceway 31 clean of foreign matter such as dust and dirt.

Figure 4:
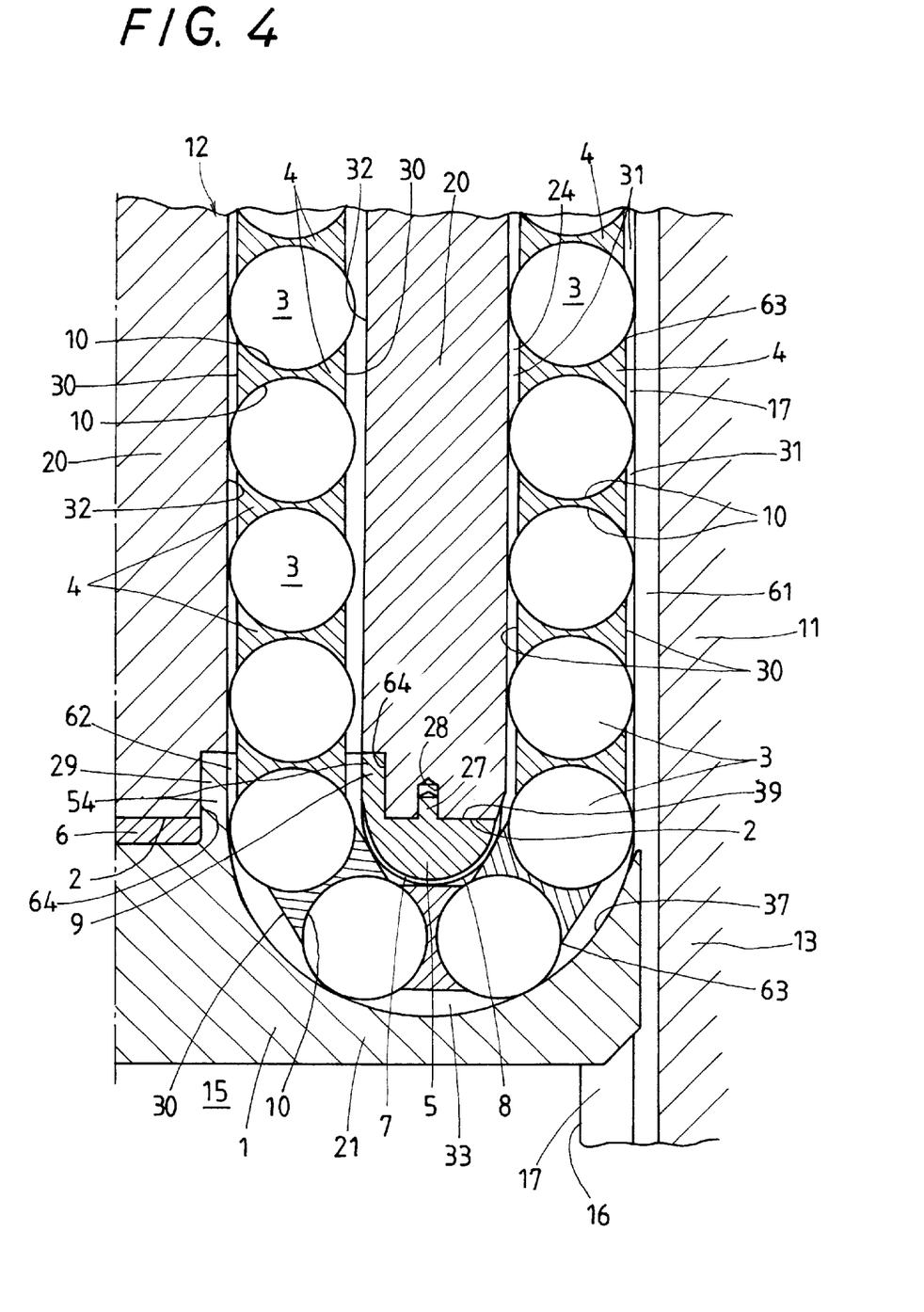
FIG. 4 is an enlarged fragmentary section explanatory of any one turnaround included in a ball-recirculating circuit installed in a slider illustrated in FIG. 1.

With the linear motion guide unit constructed as stated above, the separator 4 interposed between any two adjoining rolling elements 3 running through the ball-recirculating circuits, as shown in FIG. 4, are each formed to have a round outside periphery 30. Forward and aft end surfaces 10 of the separator 4 are made concave to fit over and conform to the rolling elements 3 that are adjacent to the separator 4. With the linear motion guide unit of the present invention, especially in a radially inside curved surface 8 of the turnaround 33 formed in the end cap 21, a radially inside gutter 7 for relief is cut lest the separators 4 come into any interference with the turnaround when traveling through there. The end caps 21 to be fastened over forward and aft end faces 2 of the carriage 20 are each comprised of a spacer part 6 with lugs 5 on which are formed the radially inside curved surfaces 8 of the turnarounds 33, and a major part 1 provided therein with radially outside curved surfaces 37 of the turnarounds 33, the major part 1 being mounted on the carriage 20 through the spacer part 6. By fitting the spacer part 6 in recesses 34, shown in FIGS. 9 and 10, formed in the end cap 21, the lugs 5 integral with the spacer part 6 are kept in position with a relation that their flat surfaces 39 come in abutment against the associated end face 2 of the carriage 20.

Figure 14:
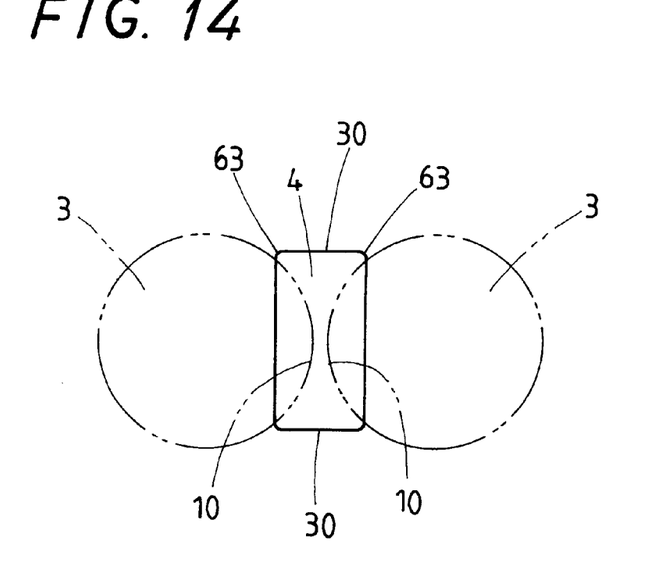
FIG. 14 is a front elevation showing another embodiment of a separator incorporated in the ball-recirculating circuit shown in FIG. 4.

According to the linear motion guide unit of the present invention, the separator 4 is made as thin as possible in thickness left between the concaved surfaces 10, 10 arranged back to back with one another, so that the adjoining rolling elements 3 are separated a little bit away from each other. The concaved surface 10 is formed to have a radius of curvature, which is a little bit larger than that of the rolling element 3. Moreover, the separator 4 is made rounded as shown at 63 in FIG. 14 at forward and aft circumferential edges where the outside periphery 30 merges with the concaved surfaces 10. The rounded edges 63 would help make sure of smooth travel of the separator 4 throughout the ball-recirculating circuits even if there were any discrepancy in position between the carriage 20 and the end cap 21 to cause some misalignment between either the load-bearing raceway 31 or the return passage 32 and the associated turnaround 33 for the ball-circulating circuit.

Figure 5:
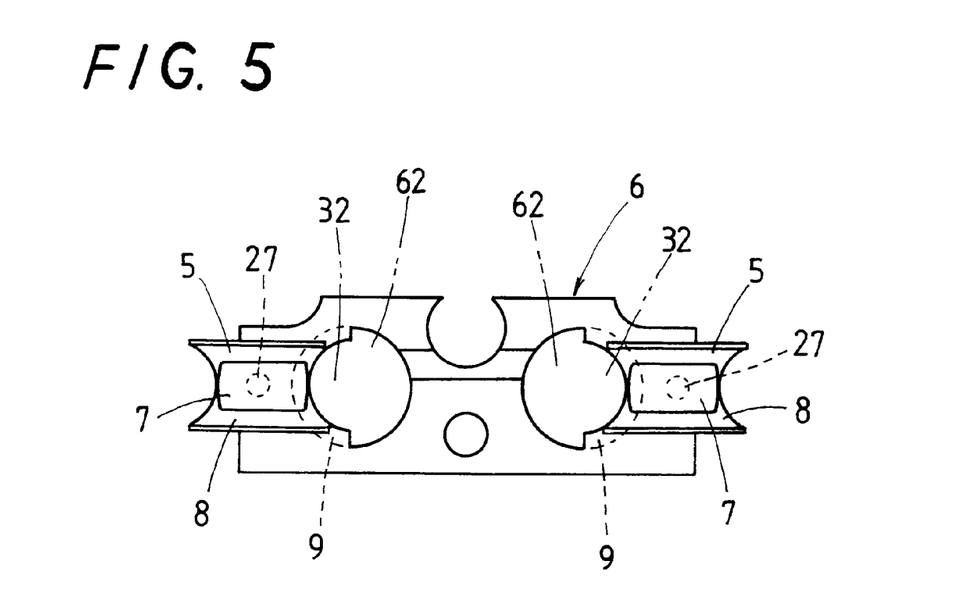
FIG. 5 is a front elevation showing a spacer to be incorporated in an end cap shown in FIG. 1.
Figure 6:
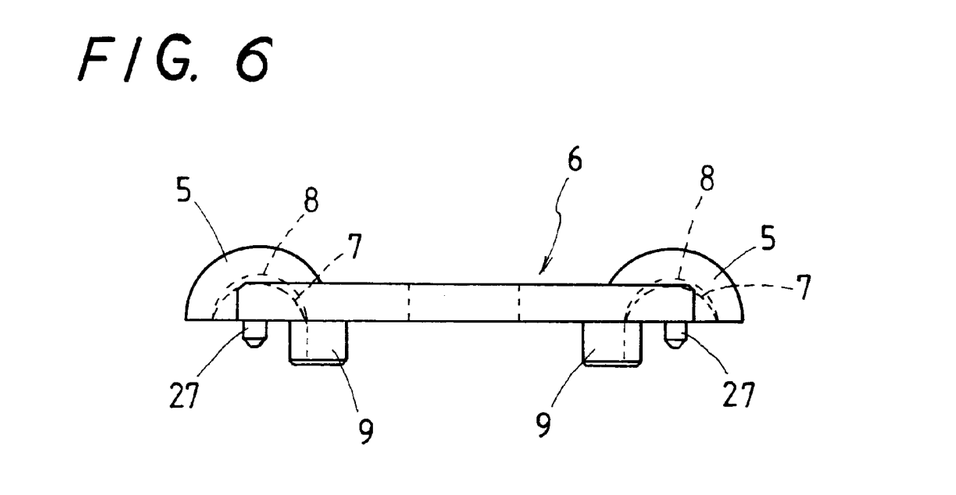
FIG. 6 is a bottom plan view of the spacer shown in FIG. 5.
Figure 7:
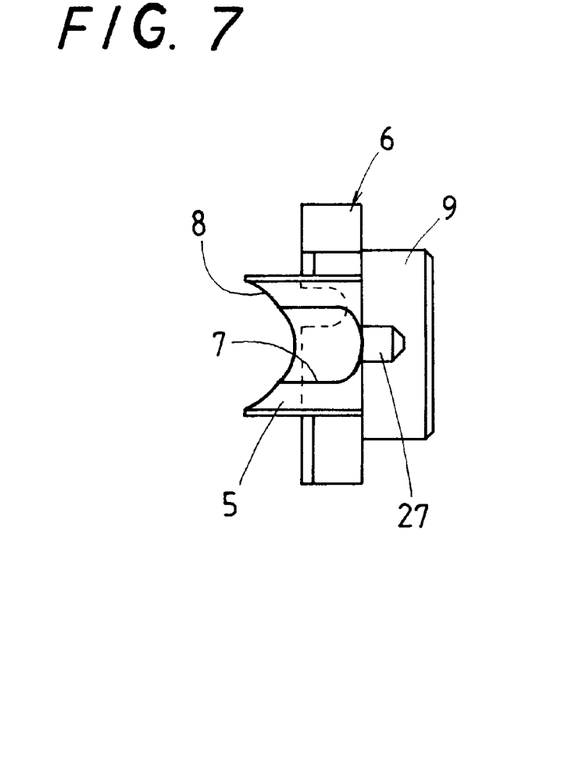
FIG. 7 is an enlarged side elevation of the spacer shown in FIG. 5.
Figure 8:
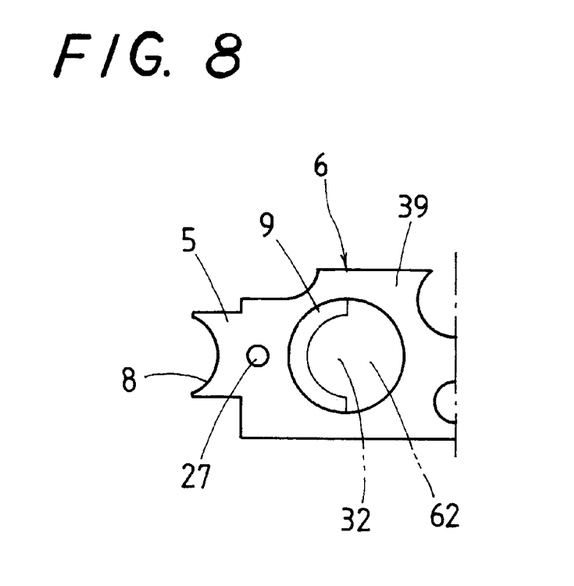
FIG. 8 is a rear elevation showing a right-hand half of the spacer of FIG. 5.
Figure 9:
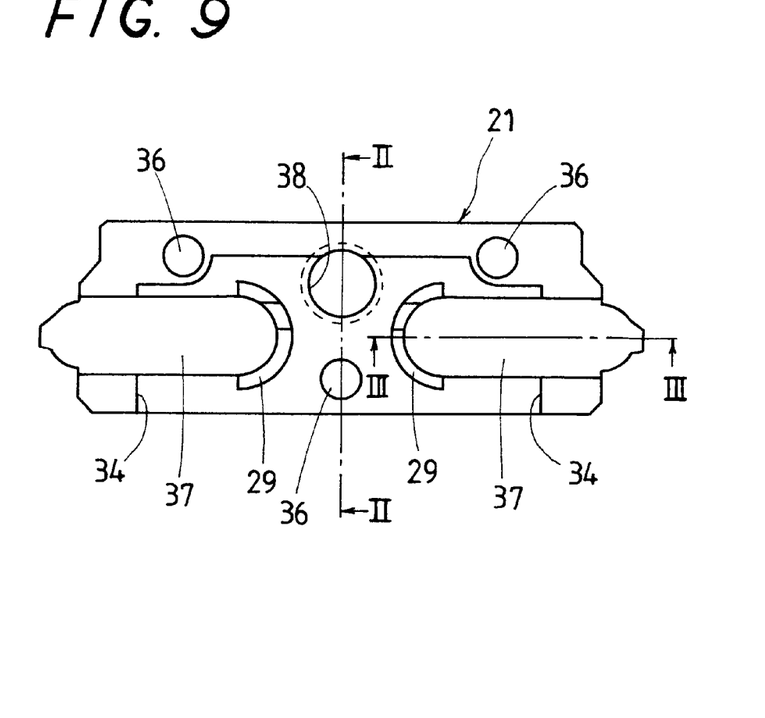
FIG. 9 is a rear elevation of the end cap in FIG. 1, which is viewed from the side of a carriage.
Figure 10:
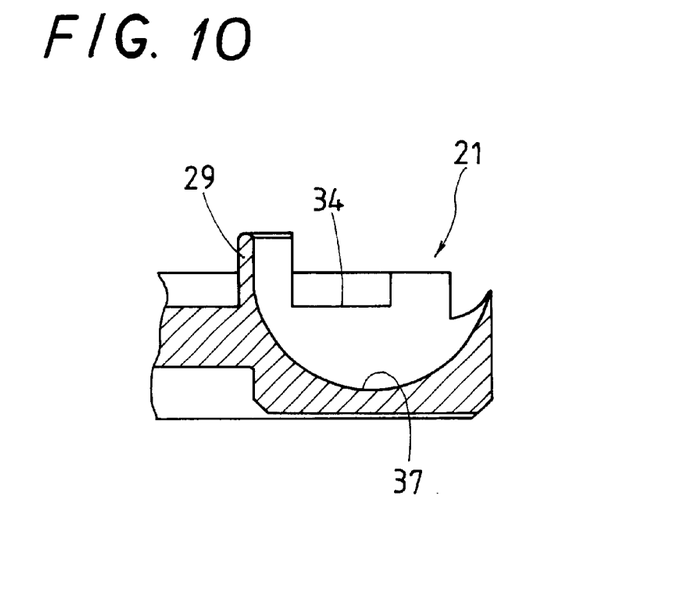
FIG. 10 is a fragmentary sectional view of the end cap in FIG. 9 and taken along the line III—III.
Figure 11:
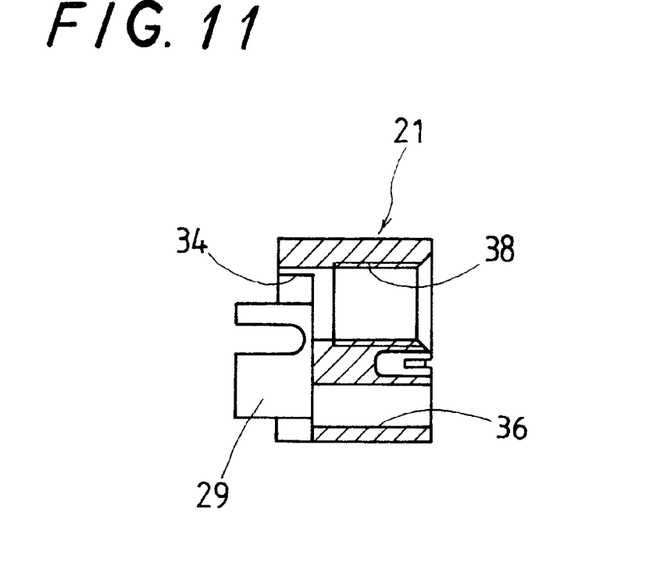
FIG. 11 is a sectional view of the end cap shown in FIG. 9 and taken along the line II—II.
Figure 12:
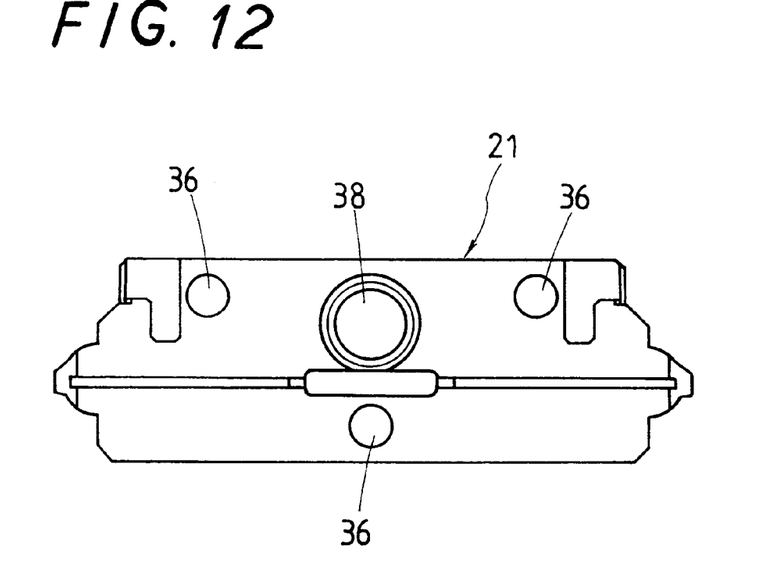
FIG. 12 is a front elevation of the end cap shown in FIG. 9.
Figure 13:
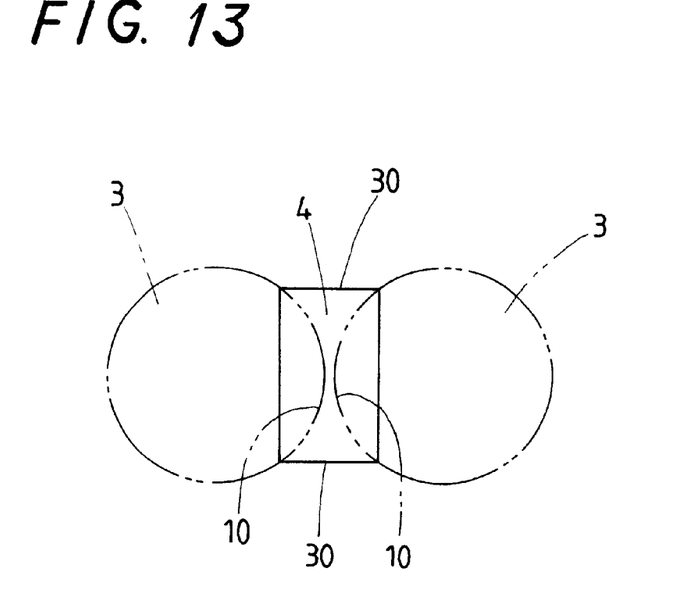
FIG. 13 is a front elevation showing a preferred embodiment of a separator incorporated in the ball-recirculating circuit shown in FIG. 4.

With the linear motion guide unit constructed as stated earlier, the lugs 5 are made integral with the spacer part 6 as shown in FIG. 5, so that the turnarounds 33 may be made by fitting the spacer part 6 into the recesses 34, shown in FIG. 9, which are formed in the end cap 21. That is to say, only fit-engagement of the single spacer part 6 with the end cap 21 is sufficient to complete the turnarounds 33 in the end cap 21. This construction helps make sure of high-precision alignment in position of components: the carriage 20, the end caps 21 and the spacer parts 6 for making up of the ball-circulating circuit where the rolling elements 3 are allowed to roll smoothly together with the separators 4 without any interference. The spacer part 6, moreover, as shown in FIGS. 6 to 8, has positioning pins 27 that protrude from the rears of the lugs 5, which confront the carriage 20. The carriage 20 is made on the end face 2 thereof with positioning holes 28 that are bored in opposition to the positioning pins 27. Only fitting the positioning pins 27 into the positioning holes 28 on the end face 2 of the carriage 20, thus, is sufficient to make sure of steady connection of the spacer part 6 to the carriage 20 with accuracy position control.

The separator 4 large in outer diameter, for example having the outer diameter making up 85% of the diameter of the rolling element 3, when running through the turnaround 33, is liable to come readily into any interference of the outer periphery 30 thereof with the radially inside curved surface 8 of the turnaround 33. To cope with this, according to the linear motion guide unit of the present invention, the radially inside curved surface 8 of the turnaround 33 is made at the center thereof with the radially inside gutter 7 for relief, which extends in the direction along which the rolling elements run through the turnaround 33. That is to say, the lugs 5 defining the radially inside curved surface 8 of the turnaround 33, as illustrated in FIGS. 5 and 7, is made at the center thereof with the radially inside gutter 7 for relief, which extends circumferentially along the radially inside curved surface 8.

The lugs 5, as made integral with the spacer part 6, are brought into combination with the major part 1 of the end cap 21 by only fit-engagement of the spacer part 6 into the recesses 34 formed in the major part 1, whereby the turnarounds 33 are provided between the radially inside curved surfaces 8 on the lugs 5 and the outside curved surfaces 37 in the major part 1 of the end cap 21, which oppose to each other.

The return passages 32 in the carriage 20 are counterbored with any hole-enlarging operation to have radially enlarged openings 64 at forward and aft open ends 62 thereof. The major part 1 of the end cap 21 has outside joint tongues 29 each of which is adapted to fit into any associated open end 62 of the return passage 32 in the carriage 20, while the spacer part 6 has inside joint tongues 9 each of which is also allowed to fit into any associated open end 62 of the return passage 32 in the carriage 20. As been understood from FIG. 4, FIGS. 6 to 8 and FIGS. 9 to 11, when the major part 1 and the spacer part 6 are assembled together to form the end cap 21, the outside and inside joint tongues 9, 29 unite with each other to provide a joint tube 54 that will be connected with the associated return passage 33. Thus, the joint tube 54 made up of the outside and inside joint tongues 9, 29 mated in alignment with each other is snugly inserted in any associated radially enlarged opening 64 at the open end 62 of the return passage 32, thereby making sure of connection without any misalignment between the return passage 32 and the turnaround 33.

Figure 15:
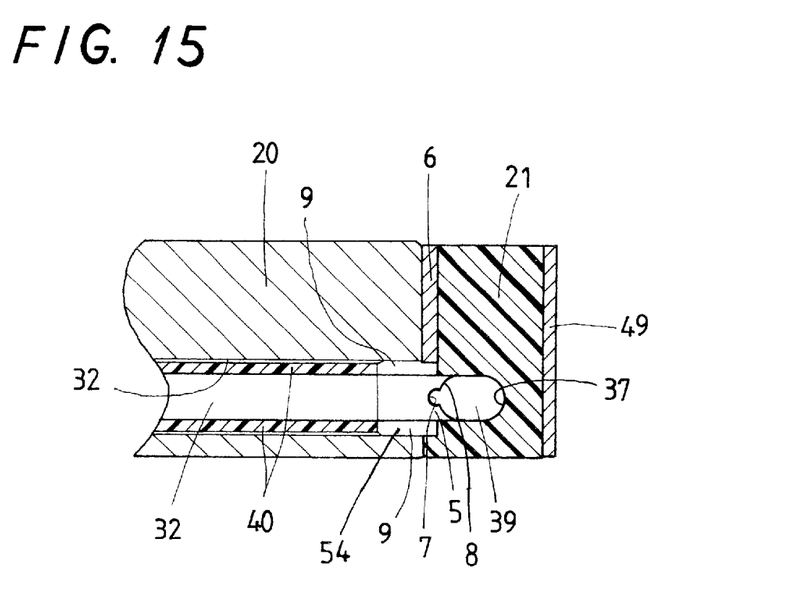
FIG. 15 is a fragmentary sectional view illustrating how a tubular member of sintered resinous material having cellular structure is installed in a return passage of the linear motion guide unit.

According to another embodiment of the linear motion guide unit of the present invention shown in FIG. 15, a tubular member 40 of sintered resinous material having cellular texture may be nested inside the return passage 32 in the carriage 20 to extend between the lengthwise opposing joint tubes 54, as having be disclosed in co-pending senior patent application in Japan No. 2001-286106. The tubular member 40 contains therein lubricant to be fed on the rolling elements 3 running through the ball-recirculating circuits. In this second embodiment, there is no need of the hole-enlarging operation to form the radially enlarged openings 64 at the lengthwise opposing open ends 62 of the return passage 32, because of the tubular member 40 is nested inside the return passage 32. Only press-fitting one joint tongue 9 of the joint tube 54 into the return passage 32 to come in abutment against any one end of the tubular member 32 is sufficient to complete the return passage 32 where there is no bump on the raceway thereof as shown in FIG. 15.

Although but the present invention is explained as being directed to the linear motion guide unit of the type shown in FIGS. 1 to 3, in which the track rail 11 has a pair of lengthwise side walls 13 spaced sidewise apart from and connected with each other, and also made on their sidewise opposing sides with raceway grooves 17, while the slider 12 is accommodated in the guide channel 15 between the side walls 13 of the track rail 11 for sliding movement lengthwise the track rail 11, it will be appreciated that other types of the linear motion guide unit, for example the type shown in FIG. 16 may be adopted well, in which the track rail 41 has raceway grooves 47 on the lengthwise sides thereof, one to each side, while the slider 42 fits over and conforms to the track rail 41 for sliding movement relatively to the track rail 41 by virtue of the rolling elements 58 and the separators, not shown. Most of components and parts of the linear motion guide unit of the type shown in FIG. 16 are the substantially same as previously described in the embodiment in FIGS. 1 to 3, so that the previous description will be applicable.

What is claimed is:

1. A linear motion guide unit comprising; a track rail having a first raceway groove extending lengthwise thereof and a slider arranged for movement relatively to the track rail by virtue of more than one rolling element, the slider being comprised of a carriage made thereon with a second raceway groove confronting the first raceway groove on the track rail to define a raceway between them, where the rolling elements are allowed to run through there, and also made therein with a return passage allowing the rolling elements to run through there, end caps fastened on forward and aft ends of the carriage, one to each end, and each made therein a turnaround that connects the raceway with the return passage to allow the rolling elements to turn round there, and more than one separator interposed between any two adjoining rolling elements to travel together with the rolling elements, wherein the separator has a round outside peripheral surface, and forward and aft end faces that are made concave to fit over the associated rolling elements, and wherein the turnaround formed in the end cap has a radially inside curved surface where a gutter for relief is cut in a way extending circumferentially of the turnaround, thereby allowing the separator to travel through the turnaround without any interference with the radially inside curved surface of the turnaround.

2. A linear motion guide unit constructed as defined in claim 1, wherein the end cap is comprised of a spacer part having a lug to provide the radially inside curved surface of the turnaround when the spacer part is fastened on the associated end of the carriage, and a major part to provide a radially outside curved surface of the turnaround when mounted on the carriage through the spacer part.

3. A linear motion guide unit constructed as defined in claim 2, wherein the spacer part integral with the lug is joined firmly to the major part with only fitting in a recess formed in the major part, whereby the turnaround is completed.

4. A linear motion guide unit constructed as defined in claim 2, wherein the gutter for relief is cut in the lug in a way extending circumferentially along a center of the radially inside curved surface of the turnaround.

5. A linear motion guide unit constructed as defined in claim 2, wherein the spacer part has positioning pins that protrude from the rears of the lugs, which confront the carriage, while the carriage made on the end face thereof with positioning holes that are bored in opposition to the positioning pins, whereby only fitting the positioning pins into the positioning holes on the end face of the carriage is sufficient to make sure of connection of the spacer part to the carriage.

6. A linear motion guide unit constructed as defined in claim 2, wherein the major part of the end cap has outside joint tongues each of which is adapted to fit into any associated open end of the return passage in the carriage, while the spacer part has inside joint tongues each of which is also allowed to fit into any associated open end of the return passage in the carriage, and wherein the outside and inside joint tongues are mated together in alignment with each other to be connected to the associated return passage.

7. A linear motion guide unit constructed as defined in claim 6, wherein a tubular member of sintered resinous material having cellular texture is nested inside the return passage in the carriage to extend between the lengthwise opposing joint tongues and the tubular member can contain therein lubricant.

8. A linear motion guide unit constructed as defined in claim 1, wherein the concaved surface is made to have a radius of curvature, which is larger than that of the rolling element.

9. A linear motion guide unit constructed as defined in claim 1, wherein the separator is made thin in thickness left between the concaved surfaces arranged back to back with one another, so that the adjoining rolling elements are separated away from each other.

10. A linear motion guide unit constructed as defined in claim 1, wherein the separator is made rounded at forward and aft circumferential edges where the outside periphery merges with the concaved surfaces, so that the rounded edges would help make sure of smooth travel of the separator throughout the ball-recirculating circuit even if there were any discrepancy in position between the carriage and the end cap to cause some misalignment between either the load-bearing raceway or the return passage and the associated turnaround for the ball-circulating circuit.

11. A linear motion guide unit constructed as defined in claim 1, wherein the track rail has first raceway grooves on the lengthwise sides thereof, one to each side, while the slider fits over and conforms to the track rail for sliding movement relatively to the track rail by virtue of the rolling elements and the separators.

12. A linear motion guide unit-constructed as defined in claim 1, wherein the track rail has a pair of lengthwise side walls spaced sidewise apart from and connected with each other, and also made on their sidewise opposing sides with the first raceway grooves, while the slider is accommodated in a guide channel between the side walls of the track rail for sliding movement lengthwise the track rail.

* * * * *